(12) United States Patent
Ludwig et al.

(10) Patent No.: US 7,025,538 B2
(45) Date of Patent: Apr. 11, 2006

(54) BONDING ANCHOR

(75) Inventors: Wolfgang Ludwig, Klosterlechfeld (DE); Erich Leibhard, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/902,707

(22) Filed: Jul. 29, 2004

(65) Prior Publication Data

US 2005/0047874 A1     Mar. 3, 2005

(30) Foreign Application Priority Data

Aug. 1, 2003   (DE) ................................ 103 36 043

(51) Int. Cl.
*E21D 21/00*     (2006.01)
(52) U.S. Cl. ................................. 405/259.5
(58) Field of Classification Search ............. 405/258.1, 405/259.1–259.6; 411/930, 82, 82.1–82.3
See application file for complete search history.

(56) References Cited

U.S. PATENT DOCUMENTS

| 6,468,010 | B1 | 10/2002 | Sager et al. |
| 2001/0028828 | A1* | 10/2001 | Sager et al. ............. 405/259.6 |
| 2002/0034424 | A1 | 3/2002 | Ludwig et al. |

* cited by examiner

*Primary Examiner*—Sunil Singh
(74) *Attorney, Agent, or Firm*—Abelman, Frayne & Schwab

(57) ABSTRACT

An anchor (1) comprising an anchor tube (2) and an inner tube (3) arranged in the anchor tube (2) for receiving a dispensable chemical mass (4). The anchor tube (2) has a first end (5) with a drilling head (6) and a second trailing end (7), at which a drilling machine can be coupled for rotary driving of the anchor (1). The anchor (1) further has a centering assembly with a first centering element (11) and a second centering element (21), which hold the inner tube (3) both radially and axially aligned in the anchor tube (2) by means of radial stop surfaces (17, 18) and axial stop surfaces (16, 26).

11 Claims, 3 Drawing Sheets

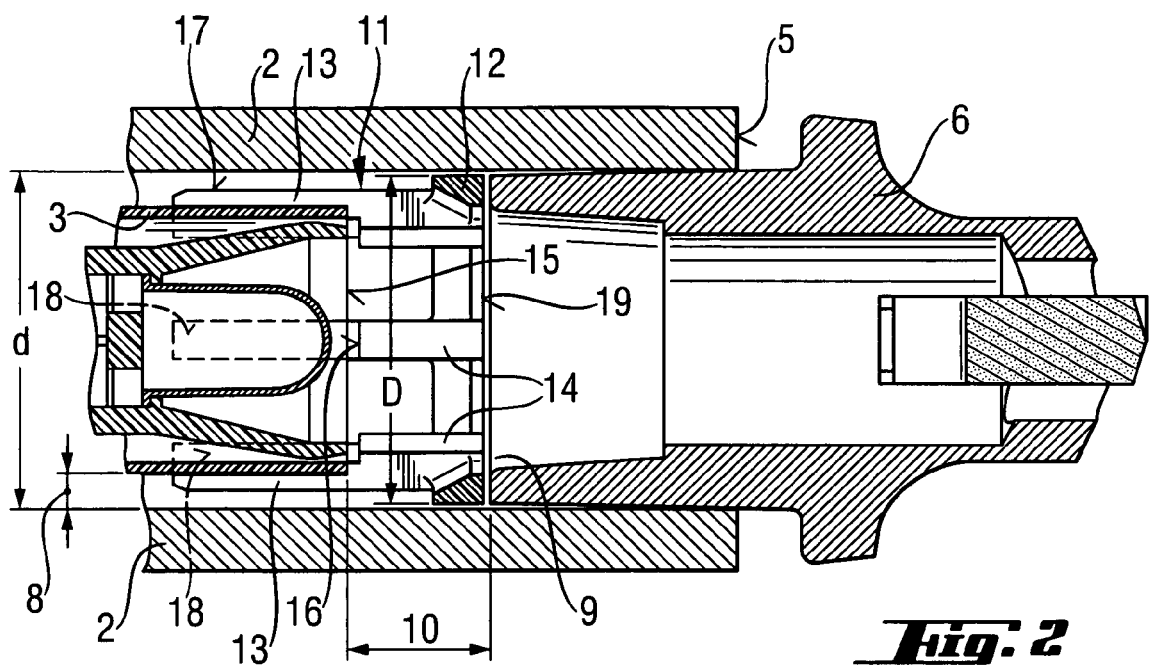
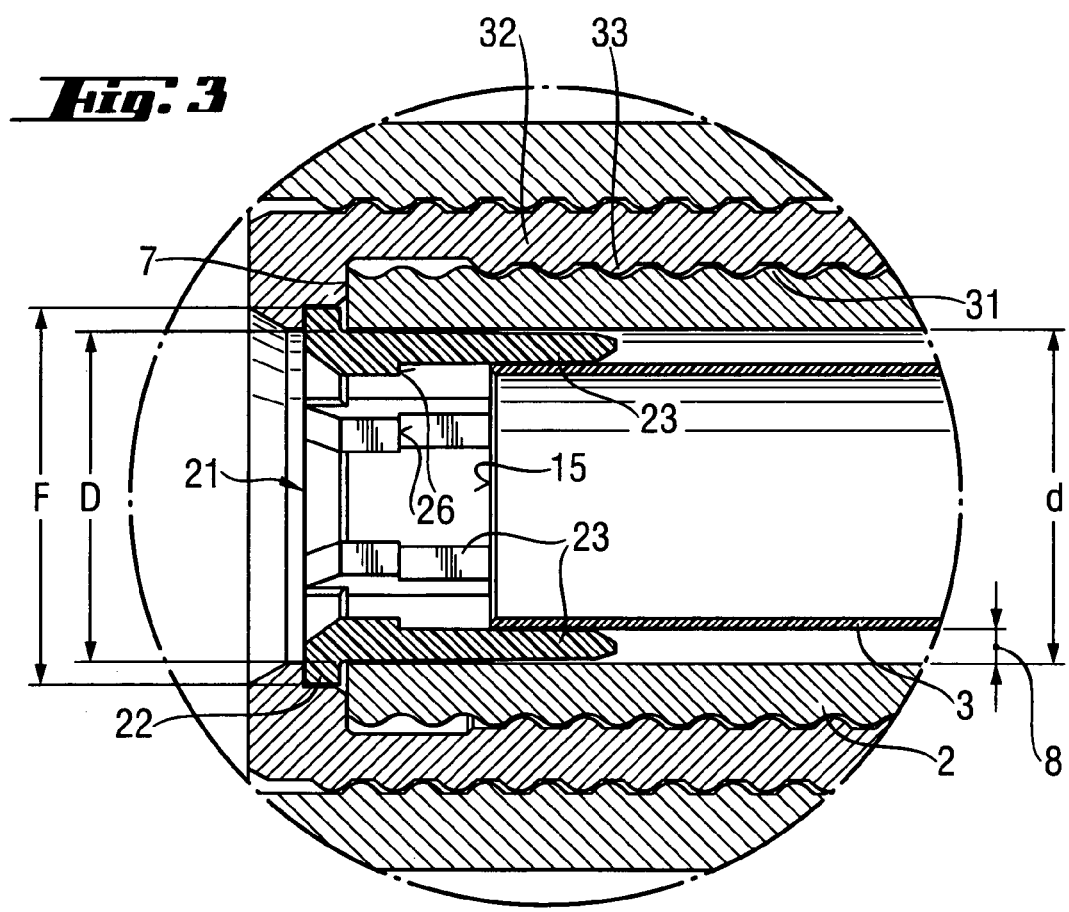

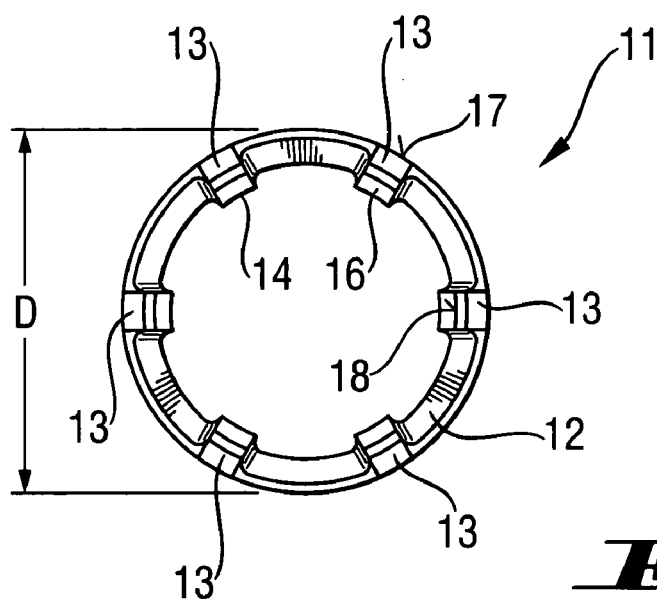
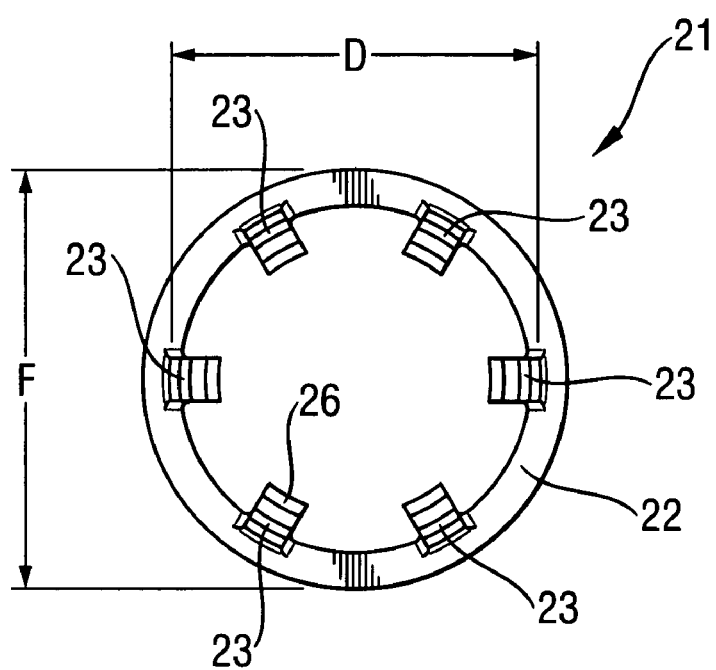

BONDING ANCHOR

FIELD OF INVENTION

The invention relates to an anchor to be bonded in a receiving material such as rock and including an anchor tube and a receiving means arranged in the anchor tube, in particular an inner tube, for receiving a dispensible chemical mass. The anchor tube has a first leading end with a drill head and a second, trailing end, at which a drilling device can be coupled for rotary driving of the anchor. The anchor further includes a centering assembly, which has at least one centering element with a radially outer stop surface for co-operating with the inner surface of the anchor tube and a radially inner stop surface for co-operating with the outer surface of the receiving means, the centering element serving in the radial alignment of the receiving means in the anchor tube.

BACKGROUND INFORMATION AND PRIOR ART

Self-drilling, chemical bonded anchors and their utilization in mining and tunnel construction have been well-known in the art for a long time. The bonded anchor is used principally for stabilizing walls in hollow spaces such as in tunnels, galleries or the like. When constructing hollow spaces, the mechanical properties and in particular the carrying capacity of the work strata is reduced. These strata are anchored by means of the bonded anchor to more remote, undamaged rock strata and as a result are secured in the receiving material.

The setting operation of the prior art anchors is accomplished in two steps. In the first step, the anchor is drilled into the receiving material using a drilling device. The receiving material broken and reduced by the drill head of the drilled anchor at its drilling end is transported away through the exit openings arranged on the drill head and the interspace between the wall of the bore hole and the outer circumference of the anchor. In the wet drilling operation, operation, water is fed in the setting direction and the broken and reduced rock is flushed out. In the dry drilling operation, the broken down and reduced rock is suctioned off In a second step, the chemical mass is pressed out using a dispensing mechanism in the direction of the base of the bore hole, whereby the mortar mass present in the anchor moves out through the exit openings out of the anchor in the drill head into the bore hole and is distributed along the interspace between the wall of the bore hole and the external periphery of the anchor tube.

DE 100 17 750 discloses, for example, an anchor, which has an anchor tube and an inner tube arranged in the anchor tube for receiving the dispensible chemical mass. The anchor tube has a first leading end with a drill head and a second, trailing end, at which a drilling device can be coupled for rotary driving of the bonding anchor. The anchor further includes a centering device, which has at least one centering element with a radially external stop surface for co-operating with the inner surface of the anchor tube and a radially inner stop surface for co-operating with the outer surface of the receiving means, the centering element serving in the radial alignment of the receiving means in the anchor tube. The inner tube is aligned within the anchor tube by means of the centering device.

The drawback of such prior art solution is that in the drilling operation and especially during the dispensing operation, any shifts of the receiving means for the dispensible mass occurring in the anchor tube cannot be taken up by the centering device. In addition, perfect removal of the broken down and reduced stone is not possible using the prior art centering device, because the passage channels can close up during the drilling operation in the event of a shift in the axial direction of the receiving means.

DE 31 00 730 A1 describes an anchor, wherein the setting operation is effected in several single steps. After creating a bore hole with a hollow drilling rod and a drill head, for example, a tube is inserted into the bore hole. A chemical mass is introduced through the rube into the bore hole, which secures the tube in the bore hole. The drawback of this solution is the laborious setting operation, which on the one hand requires considerable logistical involvement and on the other the use of several persons.

The object of the invention is to provide an anchor, which can be set quickly and simply by the user of the drilling device and further can be used in both the wet and dry drilling operations.

According to the invention, the at least one centering element for axial support of the receiving means has stop surfaces that project at least in part into the projection of one of the ends of the receiving means.

The receiving means in the anchor tube of the anchor according to the invention is held by the at least one centering element not only in the radial direction but also in the axial direction of the anchor. In this fashion, a sufficiently large annular gap between the outer surface of the receiving means and the inner surface of the anchor tube is formed for the removal of the drilling chips produced in the dry drilling operation on the one hand or for supplying water to the drill head in the wet drilling operation, and the gap is present during the entire setting operation. On the other hand, the at least one centering element in the front region of the receiving means creates sufficient passage channels for diversion of the drilling chips from the drill head into the annular gap or for diversion of the water conducted therethrough from the annular gap into the drill head. The receiving means is no longer exposed directly to the forces occurring, which act for example from the drill head on the anchor, which results in minor damage to the receiving means and consequently reduces the susceptibility of the bonding anchor to failure. Preferably, a space is present between the leading end of the receiving means and the axial space surfaces of the at least one centering element, so that minor axial movements of the receiving means within the anchor tube can be compensated. Because the centering elements are used as single elements, they can be used also in anchors cut to length on site.

Preferably, the at least one centering element has axially attending webs for forming the radial stop surfaces and the axial stop surfaces. The webs can include fingerlike receiving means in its leading region. The webs have a length, in the event of an axial shift of the receiving means within the anchor tube and can continue to adequately hold the receiving means. Advantageously, the webs are radially expandable under axial pressure. Accordingly, the receiving means can be urged in the direction of the drill head into a receptacle formed at the insertion end of the drill head after completing the drilling operation, so that the mass dispenses by means of the pressing-out mechanism cannot flow back through the annular space between the receiving part and the anchor tube.

Preferably, the at least one centering element has at least three radial stop surfaces and three axial stop surfaces. Using at least three radial stop surfaces the guide assembly and the oriented support of the receiving means is made possible in the anchor tube.

Preferably, the radial stop surfaces and axial stop surfaces of the at least one centering element are arranged ring-shaped on a base body, wherein the base body has at least one opening. The at least one opening is preferably arranged centrally on the base part. The anchor tube has generally a circular cross-section with an inner core. The radius of the circular arrangement of the radial and axial stop surfaces corresponds approximately to the radius of the inner core of the anchor tube.

The base part is preferably formed as a disk, whose outside diameter corresponds approximately to the inside diameter of the anchor tube. At least one opening is arranged in the base part for creation of passage channels. A preferred configuration of the centering element has a ring-shaped base part, on which, perpendicular to the plane that extends through the base part, aligned webs are formed. In lieu of a disk-shaped configuration of the base part, the base part can also have a polygonal configuration.

Advantageously, the at least one centering element has, for its axial securement in the anchor tube, axial limiting surfaces. The axial limiting surfaces are arranged on the side of the base part, which are arranged with the facing side of the base part having the stop surfaces. If the at least one centering element, for example, is arranged on the setting-side end of the anchor, the centering element abuts with its axial limiting surface on the insertion end of the drill head, whereby an undesired shift of the centering element in the setting direction is prevented.

Preferably, the centering device includes two centering elements. Using two centering elements, the mounting of the receiving means in the anchor tube is made possible without additional support in the longitudinal direction. In on another embodiment, the insertion end of the drill head, for example, has a receptacle, in which the end of the receiving means lying in the setting direction of the bonding anchor is held and the other end is held aligned in the anchor tube only using one centering element.

Preferably, the at least one centering element has at least one flange stop for creating an axial limiting surface on the base part. The centering element is particularly suitable for arrangement on the second, free end of the anchor tube and is, for example, attached on that end. The outer diameter of the flange stop is preferably larger than the inner diameter of the anchor tube, whereby the axial path of the centering element is limited in the setting direction.

Preferably, for the axial securement of the at least one centering element, a retaining sleeve is provided that can cooperate with the anchor tube, whereby in the region of the second end, an outer thread is formed on the anchor tube in the region of the trailing end of the anchor tube and the retaining sleeve has an inner thread that can be brought into engagement with the outer thread on the anchor tube. The retaining sleeve preferably has a base section, which secures the at least one centering element on the second, trailing end against displacement opposite to the setting direction of the anchor. This arrangement is particularly advantageous, when the at least one centering element has a flange section as the axial limiting surface.

Advantageously, the at least one centering element is fashioned out of plastic, optionally in an injection molding process. This makes it possible to inexpensively manufacture the at least one centering element in large quantities.

Other advantageous embodiments and combinations of features of the invention will become apparent from the following detailed description and the set of patent claims.

BRIEF DESCRIPTION OF THE DRAWINGS

The invention will be more completely described in the following using an exemplary embodiments. Wherein:

FIG. 2 is an enlarged detail section in accordance with Region A of FIG. 1;

FIG. 3 is an enlarged detail section in accordance with Region B of FIG. 1;

FIG. 4 is an internal view of a first centering element, and

FIG. 5 is an internal view of a second centering element.

In principle, identical parts in the Figures are provided with the same reference numbers.

DETAILED DESCRIPTION OF THE INVENTION

Figure 1:
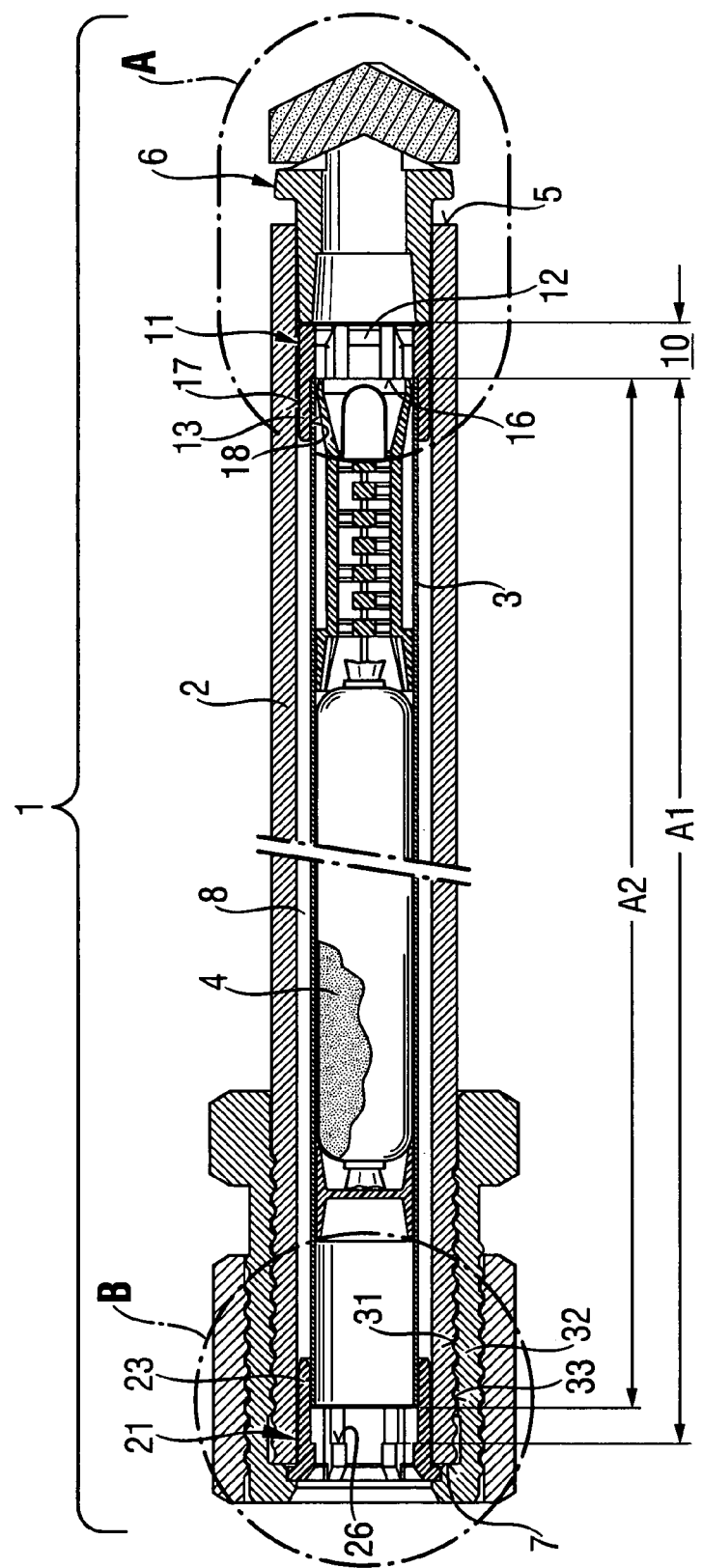
FIG. 1 is an axially extending section of the anchor according to the invention.

The anchor 1 is to be based in a region of a receiving material and is formed of an axially extending anchor tube 2 and an axially extending inner tube 3 arranged therein. A dispensable mass 4 packaged in a foil bag is arranged in the inner tube 3. The anchor tube 2 has a first leading end 5 with an incorporated drill head 6 and an opposite second trailing end 7. The inner tube 3 is radially and axially held by means of a centering assembly including a first centering means 11 and a second centering means 21.

The first centering means 11 according to FIG. 2 has a ring-shaped base part 12, whose outside diameter D corresponds approximately to the inside diameter d of the anchor tube 2. Six webs 13 extend axially from the base part 12, the webs are uniformly distributed around the periphery of the base part 12. The webs 13 each have a thickened part 14 for the creation of an axial stop surface 16 for the inner tube 3, which projects into the projection of the front and 15 of the inner tube. The region of the webs 13, which encompasses the inner tube 3 at least partially in the front region zone, forms the radial outer stop surface 17 and the radial inner stop surface 18 for the radial alignment of the inner tube 3 in the anchor tube 2. To this end, an adequately large annular space 8 is created between the inner tube 3 and the anchor tube 2, which makes possible an extraction of drilling chips in the case of a dry drilling operation or a feeding of water in the case of a wet drilling operation. The annular space 8 is approximately 2 mm in the case of wet drilling.

The first centering element 11 has on the base part 12 an axial limiting surface 19 facing the drill head 6, which is on the insertion end 9 of the drill head 6. The thickened parts 14 create, between the front end 15 of the inner tube 3 and the insertion end 9 of the drill head 6, a sufficient clearance; in this case, for example, the clearance 10 has an axial length of 5 mm, for diverting the drilling chips from the drill head 6 or for diverting the water into the drill head 6.

In contrast with the first centering element, the second centering element 21 according to FIG. 3 for creation of an axial limiting surface, has a flange-like base part 22, whose outside diameter F is configured larger than the inner diameter d of the anchor tube 2. The diameter D of the six webs 23, arranged ring-like on the base part, corresponds to the inner diameter d of the anchor tube. Otherwise, the configuration of the webs 23 correspond substantially to the configuration of the webs 13 of the first centering element 11, so that also the webs 33 have an axial stop surface 26 for the inner tube 3. The axial distance A1 between the axial stop surfaces 16 of the first centering element 11 and the axial stop surface 26 of the second centering element 21 is selected to be greater than the axial length A2 of the inner tube 3, in order to make possible a limited axial displacement of the inner tube 3 within the anchor tube 2.

For affixing the second centering element 21 on the anchor tube 2, the anchor tube 2 has an outer thread 31 on the second free end 7, on which a retaining sleeve 32 having an internal thread 33 can be screwed on. The retaining sleeve 32 is configured in such a fashion that the second centering element 21 is partially encompassed and accordingly held.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

The invention claimed is:

1. An anchor to be bonded in a receiving material comprising an axially extending anchor tube (2) and a receiving means arranged in said anchor tube, said receiving means comprises an axially extending inner tube (3) for holding a dispensable chemical mass (4) for bonding the anchor tube (2) when dispensed, and said inner tube (3) is spaced radially inwardly from said anchor tube (2) and forming a gap therebetween said anchor tube (2) has a leading end (5) with a drill head (6) and an opposite trailing end (7) to which a drilling machine can be coupled for rotary driving of said anchor tube (2) and its contents, a centering assembly radially inwardly of said anchor tube (2), said centering assembly comprising at least one centering element (11,21) having a radial outer stop surface (17) cooperating with an inner surface of said anchor tube (2) and a radially inner stop surface (18) cooperating with an outwardly facing surface of said receiving means for radial alignment of said receiving means in said anchor tube (2), said at least one centering element (11, 21) has stop surface (16, 26) projecting at least partially into a projection of one of an end (15) of said receiving means for axial support of said receiving means.

2. An anchor, as set forth in claim 1, wherein said at least one centering element (11, 21) has axially extending webs (13, 23) forming said radial stop surfaces (17, 18) and said axial stop surfaces (16, 26).

3. An anchor, as set forth in claim 1, wherein said at least one centering element (11, 21) has at least three radial stop surfaces (17, 18) and three axial stop surfaces (16, 26).

4. An anchor, as set forth in claim 1, wherein radial stop surfaces of said at least one centering element are spaced circumferentially apart on a ring shaped base part (12, 22) with said base part (12, 22) forming at least one centrally arranged opening.

5. An anchor, as set forth in claim 4, wherein said at least one opening is arranged centrally on said base part (12,22).

6. An anchor, as set forth in claim 1, wherein said at least one centering element (11, 21) has axial limiting surfaces (19) for axial fixation in said anchor tube (2).

7. An anchor, as set forth in claim 1, wherein said centering assembly has two said centering elements (11, 21) one at a leading end of said inner tube (3) and the other at a trailing end of said inner tube (3).

8. An anchor, as set forth in claim 1, wherein said at least one centering element (21) has a flange stop for forming an axial limiting surface on a base part (22).

9. An anchor, as set forth in claim 1, wherein a retaining sleeve (32) cooperating with said anchor tube (2) is provided for the axial fixation of said at least one centering element (21) in the region of said second trailing end (7) of said anchor tube (2), an outer thread (31) is formed on said anchor tube (2), said retaining sleeve (32) has an internal thread (33) that can be engaged with said outer thread (31) of said anchor tube (2).

10. An anchor, as set forth in claim 1, wherein said at least one centering element (11, 21) is formed of a plastic material.

11. An anchor, as set forth in claim 10, wherein said at least one centering element is formed in an injection molding process.

* * * * *